H. E. Plumb,
Hay Elevator,
Nº 37,704.    Patented Feb. 17, 1863.

Witnesses.    Inventor.

UNITED STATES PATENT OFFICE.

HENRY E. PLUMB, OF MONROE, CONNECTICUT.

IMPROVED ELEVATOR AND CARRIER.

Specification forming part of Letters Patent No. 37,704, dated February 17, 1863.

*To all whom it may concern:*

Be it known that I, HENRY E. PLUMB, of Monroe, in the county of Fairfield and State of Connecticut, have invented a new and Improved Elevator and Carrier; and I do hereby declare that the following is a full, clear, and exact description of the same, reference being had to the accompanying drawings, making a part of this specification, in which—

Figure 1:
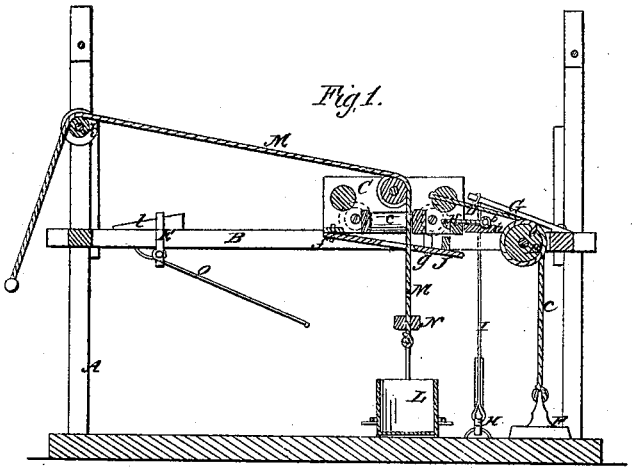
Figure 2:
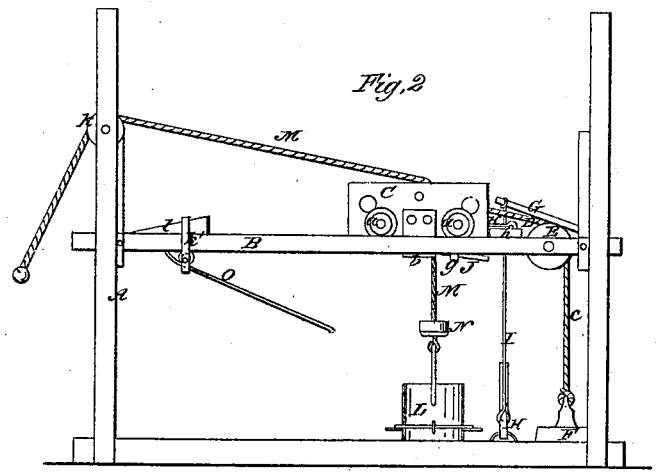
Figure 3:
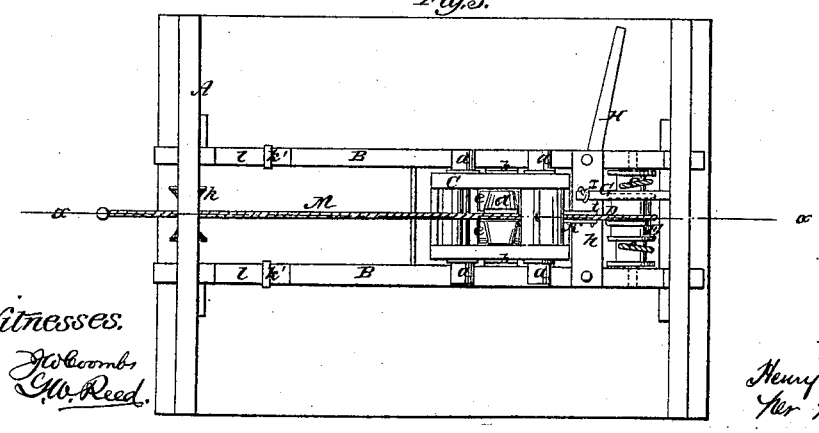

Figure 1 is a vertical section of my invention, taken in the line $x\ x$, Fig. 3; Fig. 2, a side elevation of the same; Fig. 3, a plan or top view of the same.

Similar letters of reference indicate corresponding parts in the several figures.

This invention relates to a new and improved machine for elevating articles to a desired height and then conveying or carrying them to the spot where they are to be deposited.

The machine is designed to be operated by horse-power and is intended for depositing hay in barns, loading and unloading vessels, and such like purposes.

To enable those skilled in the art to fully understand and construct my invention, I will proceed to describe it.

A represents a framing, which may be constructed in any proper manner to support the working parts of the machine, and B B are two parallel horizontal ways or guides, which are secured to the framing A at any suitable or desired height.

C is a carriage provided with wheels $a$, which run on the ways B B and are provided with flanges at their ends to keep them on the ways. The carriage is also provided at its bottom with horizontal lips or arms $b\ b$, which extend underneath the ways B B and prevent the carriage from casually rising therefrom.

To one end of the carriage C there is attached a rope, D, which passes around a drum, E, the shaft or journals of which are fitted in the ways B B at one end of them, the drum being between the ways. To this drum E there are attached by ropes $c\ c$ weights F F, both ropes being shown in Fig. 3, and one rope and weight being shown in Figs. 1 and 2.

G is a friction-brake, which is composed of a lever attached at one end to the framing A. This lever bears upon the drum E, and to the free or disengaged end of said lever a treadle, H, is connected by a rod, I.

Within the carriage C there is placed a roller, $d$. This roller is placed transversely in the carriage at its upper part, and directly underneath the roller $d$ there are placed two rollers, $e\ e$, the latter having a longitudinal position in the carriage. (See Figs. 1 and 3.) To the bottom of the carriage C there is attached a flap, J, which is simply a short board or bar connected at one end to the bottom of the carriage by a joint, $f$. The free or disengaged end of the flap D rests on a bar, $g$, as shown in Figs. 1 and 2. On the ways B B, directly in front of the drum E, there is a cross-bar, $h$, to which a hook, K, is attached by a joint or hinge, $i$. This hook, when the carriage is at rest, catches over a bar, $j$, at the lower part of the carriage and holds the same on the ways, preventing it from moving.

L represents a bucket, which is attached to a rope, M, the latter passing up between the rollers $e\ e$ and over the roller $d$, and then over a roller, $k$, in the framing and over other convenient or necessary guide roller or rollers to the spot where the animal is to be attached. To the rope M, at any suitable point below the flap J, there is secured an adjustable button or knob, N.

The operation is as follows: The bucket L is filled with the article to be raised, and the animal being started the bucket is drawn upward, the carriage C being retained by the hook K and prevented from moving on the ways B under the action of the rope M. The bucket ascends until the button or knob N strikes the flop D, and the latter is raised thereby and the hook K lifted and freed from the bar $j$. By this means the carriage is liberated and is made to move along on the ways B under the pull of rope M, until over the spot where it is designed to have the contents of the bucket deposited. When the bucket is conveyed to this point, it is tilted in consequence of coming in contact with an inclined frame, O, which is formed by bending a metal rod so as to form three sides of a square. This frame O, however, may be arranged in any proper way so as to offer an obstruction to the bucket, and said frame is attached to the ways B B by means of clasps k' k' and keys or wedges l, the clasps being attached to the frame O and made to encompass the ways B and the wedges l inserted in the upper parts of the clasps above the ways. By this mode of attaching the frame O to the ways B B the former may be adjusted at different points on the ways, according to the spot where the contents of the bucket are to be deposited. The lower end of the frame O should have such a relative position with the bucket that the lower part of the latter will strike the frame and cause the bucket to tilt.

The weights F F and brake G are an important feature of the invention, the weights F serving as a counterpoise to the filled bucket and preventing the carriage being forced forward on the ways under the weight of the bucket and its contents, and if the weights f are not sufficient to effect this the brake G is applied to the drum E by depressing the treadle H with the foot. The weights F also bring back the carriage C to its original position after the bucket has been relieved of its contents and the animal backed to the place from whence he started.

It will be seen that by adjusting the button or knob N higher or lower on the rope M, the bucket may be elevated to any desired height before the carriage C is allowed to move on the ways B B, and it will also be seen that by arranging the rollers d e e, as shown, the rope M may be pulled or drawn in a direction parallel with the ways B B or more or less obliquely with them.

In case hay or other similar substance is to be elevated, a fork or grapple is attached to the rope M, instead of the bucket L. Any of the ordinary hay-elevating forks in use may be employed for the purpose.

Having thus described my invention, what I claim as new, and desire to secure by Letters Patent, is—

1. The combination of the carriage C, ways B B, counterpoise-weights F F, and rope M, all arranged substantially as shown, for the purpose specified.

2. The hook K and flap J, in connection with the button or knob N on the rope M, arranged substantially as shown, for liberating the carriage C at any desired elevation of the bucket, as set forth.

3. The brake G, when used in combination with the counterpoise-weights F F, drum E, and carriage C, as and for the purpose specified.

4. The adjustable frame O, when used in combination with the carriage C, ways B B, and bucket L, or other receptacle or load-holder, for the purpose of discharging the elevated load at the desired spot, as described.

HENRY E. PLUMB.

Witnesses:
RUSSELL L. WARNER,
DAVID WELLS.